US009529352B2

(12) United States Patent
Iuchi

(10) Patent No.: US 9,529,352 B2
(45) Date of Patent: Dec. 27, 2016

(54) NUMERICAL CONTROL DEVICE

(71) Applicant: Mitsubishi Electric Corporation, Chiyoda-ku, Tokyo (JP)

(72) Inventor: Yukihiro Iuchi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 504 days.

(21) Appl. No.: 14/344,132

(22) PCT Filed: Jun. 6, 2013

(86) PCT No.: PCT/JP2013/065732
§ 371 (c)(1),
(2) Date: Mar. 11, 2014

(87) PCT Pub. No.: WO2014/196066
PCT Pub. Date: Dec. 11, 2014

(65) Prior Publication Data
US 2015/0134101 A1   May 14, 2015

(51) Int. Cl.
*G06F 19/00* (2011.01)
*G05B 19/402* (2006.01)
*G05B 19/408* (2006.01)

(52) U.S. Cl.
CPC ......... *G05B 19/402* (2013.01); *G05B 19/4086* (2013.01); *G05B 2219/45141* (2013.01); *G05B 2219/50049* (2013.01)

(58) Field of Classification Search
CPC .................................................. G05B 19/402
(Continued)

(56) References Cited

U.S. PATENT DOCUMENTS 3,730,030 A * 5/1973 Gilbert .................. B23Q 5/344
82/132
4,120,583 A * 10/1978 Hyatt .................. B60R 16/0373
355/132
(Continued)

FOREIGN PATENT DOCUMENTS

JP          10-6178 A       1/1998
JP       2004-030422 A      1/2004
(Continued)

OTHER PUBLICATIONS

Tsutsumi, Masaomi, and Akinori Saito. "Identification of angular and positional deviations inherent to 5-axis machining centers with a tilting-rotary table by simultaneous four-axis control movements." International Journal of Machine Tools and Manufacture 44.12 (2004): pp. 1333-1342.*

(Continued)

*Primary Examiner* — Satish Rampuria
(74) *Attorney, Agent, or Firm* — Sughrue Mion, PLLC; Richard C. Turner

(57) ABSTRACT

A numerical control device has: a program reading unit reading a machining program; an inclined-surface setting unit setting an inclined-surface coordinate system regarding an inclined surface; an indexing-angle generating unit calculating an indexing angle where a tool used for machining of the inclined surface is oriented perpendicular to the inclined surface, and generating a move command. The program reading unit outputs an inclined-surface setting command instructing setting of the inclined-surface coordinate system, an inclined-surface indexing command instructing calculation of the indexing angle, and a tool selection command instructing selection of any of tools respectively having different mounting angles. The inclined-surface setting unit sets the inclined-surface coordinate system according to the inclined-surface setting command.

(Continued)

The indexing-angle generating unit calculates, according to the inclined-surface indexing command, the indexing angle regarding the tool that is selected according to the tool selection command.

10 Claims, 9 Drawing Sheets

(58) Field of Classification Search
    USPC .................................................. 700/159–185
    See application file for complete search history.

(56) References Cited

U.S. PATENT DOCUMENTS

| | | | | |
|---|---|---|---|---|
| 6,328,508 B1 * | 12/2001 | Jines | ........................ | B23Q 7/02 |
| | | | | 409/131 |
| 6,478,688 B1 * | 11/2002 | Fukui | ................. | A63B 69/3614 |
| | | | | 473/251 |
| 2006/0103824 A1 * | 5/2006 | Park | ...................... | G03F 9/7026 |
| | | | | 355/55 |
| 2013/0006394 A1 | 1/2013 | Iuchi et al. | | |
| 2013/0166059 A1 | 6/2013 | Terada et al. | | |
| 2013/0204427 A1 | 8/2013 | Terada et al. | | |

FOREIGN PATENT DOCUMENTS

| | | | |
|---|---|---|---|
| JP | 4888619 | B1 | 2/2012 |
| JP | 5079165 | B2 | 11/2012 |
| JP | 5240412 | B1 | 7/2013 |
| WO | 2011/117915 | A1 | 9/2011 |
| WO | 2012/172594 | A1 | 12/2012 |
| WO | 2013/118169 | A1 | 8/2013 |

OTHER PUBLICATIONS

Jung, Y. H., et al. "NC post-processor for 5-axis milling machine of table-rotating/tilting type." Journal of Materials Processing Technology 130 (2002): pp. 641-646.*

Jensen, C. Greg, W. Edward Red, and J. Pi. "Tool selection for five-axis curvature matched machining." Computer-Aided Design 34.3 (2002): pp. 251-266.*

International Search Report of PCT/JP2013/065732 dated Aug. 20, 2013.

* cited by examiner

| TOOL | MOUNTING ANGLE |
|---|---|
| A | 0 DEGREE |
| B | 90 DEGREES |
| C | 180 DEGREES |
| D | 270 DEGREES |

NUMERICAL CONTROL DEVICE

CROSS REFERENCE TO RELATED APPLICATIONS

This is a National Stage of International Application No. PCT/JP2013/065732 filed Jun. 6, 2013, the content of all of which is incorporated herein by reference in its entirety.

FIELD

The present invention relates to a numerical control device that carries out numerical control (NC) for a multi-axis machine tool provided with a rotary axis.

BACKGROUND

A machine tool mounted with a numerical control device drives each axis to move a tool to a position instructed by the numerical control device. Regarding a conventional numerical control device that controls a multi-axis machine tool provided with a rotary axis, when a tool is not oriented perpendicular to a machining surface, the conventional numerical control device usually rotates the rotary axis to control an orientation of the tool such that the tool is oriented perpendicular to the machining surface.

As a method of controlling an orientation of a tool such that the tool is oriented perpendicular to a tilted machining surface, there is a method proposed in Patent Literature 1 for example. Patent Literature 1 discloses determining any one of a method of moving a rotary axis and a method of moving the rotary axis and a linear axis to retain a tool tip position with respect to a workpiece. Regarding a machine tool provided with a turret lathe, Patent Literatures 2 and 3 disclose a method of automatically calculating an indexing angle depending on selection of a tool mounted on the turret lathe.

CITATION LIST

Patent Literature

Patent Literature 1: Japanese Patent No. 5079165
Patent Literature 2: Japanese Patent Application Laid-Open No. 2004-30422
Patent Literature 3: Japanese Patent Application Laid-Open No. H10-6178

SUMMARY

Technical Problem

The method disclosed in Patent Literature 1 enables control of the tool orientation in a case where the tool extends in a predetermined one direction. In a case of a turret lathe where tools extend in plural directions, the method disclosed in Patent Literature 1 needs to calculate, with respect to each of the tools, an indexing angle where the tool is oriented perpendicular to a tilted machining surface. Therefore, there is a problem in that a work efficiency in the control of the tool orientation is deteriorated. According to the technique disclosed in Patent Literatures 2 and 3, it is possible to automatically calculate the indexing angle with respect to each of the tools mounted on the turret lathe. In this case, mounting angles of the tools need to be instructed by a machining program, which causes a problem that the machining program becomes complicated.

The present invention has been devised in view of the above and it is an object of the present invention to achieve a numerical control device that makes it possible to calculate, without complicating a machining program, the indexing angle for a plurality of tools extending in respectively different directions and to improve a work efficiency in control of a tool orientation.

Solution to Problem

In order to solve the above-mentioned problems and achieve the above-mentioned object, the present invention provides a numerical control device that controls a position and an orientation of a tool with respect to a workpiece. The numerical control device has: a program reading unit configured to read a machining program for machining of the workpiece; an inclined-surface setting unit configured to set an inclined-surface coordinate system with regard to an inclined surface of the workpiece, wherein the inclined surface is a machining surface tilted with respect to a machine coordinate system used as a reference for position control, and an indexing angle is a rotation angle of a rotary axis where the tool used for machining of the inclined surface is oriented perpendicular to the inclined surface; an indexing-angle generating unit configured to receive the inclined-surface coordinate system set by the inclined-surface setting unit, to calculate the indexing angle, and to generate a move command that instructs movement of the rotary axis such that the orientation corresponding to the calculated indexing angle is achieved; and a moving-amount calculating unit configured to calculate a moving amount for each control cycle in accordance with the move command. The program reading unit outputs, depending on contents of the machining program, an inclined-surface setting command that instructs setting of the inclined-surface coordinate system, an inclined-surface indexing command that instructs calculation of the indexing angle, and a tool selection command that instructs selection of any one of the tools, a mounting angle being different for each of the tools. The inclined-surface setting unit sets the inclined-surface coordinate system in accordance with the inclined-surface setting command output from the program reading unit. The indexing-angle generating unit calculates, in accordance with the inclined-surface indexing command output from the program reading unit, the indexing angle regarding the tool that is selected in accordance with the tool selection command output from the program reading unit.

Advantageous Effects of Invention

The numerical control device according to the present invention makes it possible to calculate the indexing angle by the same command for any of the tools used in machining of the inclined surface. The numerical control device can automatically calculate, without complicating the machining program, the indexing angle for each tool irrespective of the mounting angle. The numerical control device can calculate the indexing angle which serves as a base for a command for the rotary axis, without an individual computation depending on the tool to be used. It is thus possible to improve the work efficiency in the control of the tool orientation. In this manner, the numerical control device makes it possible to calculate, without complicating the machining program, the indexing angle for the plurality of tools extending in respectively different directions and to improve the work efficiency in the control of the tool orientation.

DESCRIPTION OF EMBODIMENTS

Embodiments of a numerical control device according to the present invention will be described in detail below with reference to the drawings. It should be noted that the present invention is not limited by the embodiments.

First Embodiment

Figure 1:
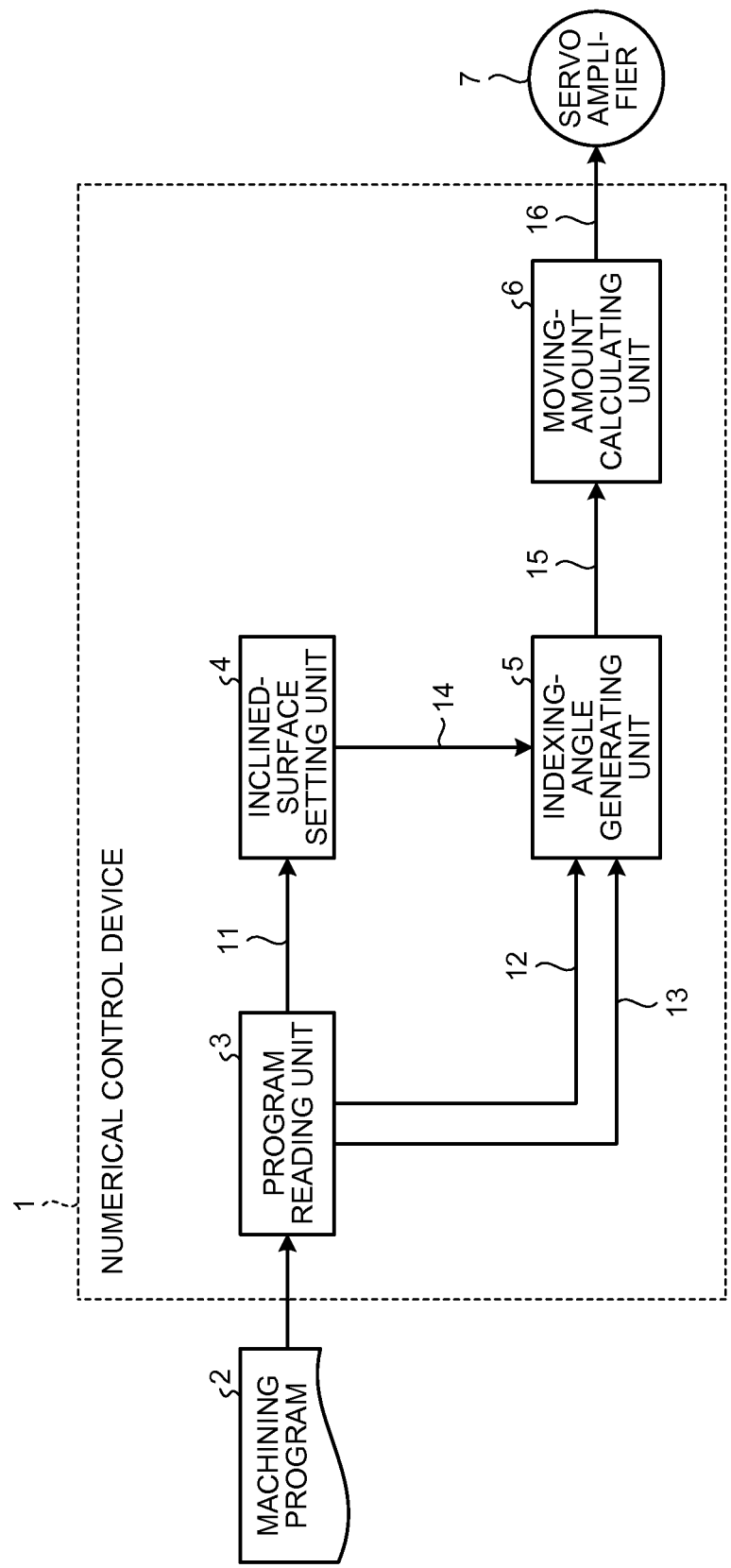
FIG. 1 is a block diagram showing a configuration of a numerical control device according to a first embodiment of the present invention.

FIG. 1 is a block diagram showing a configuration of a numerical control device according to a first embodiment of the present invention. A numerical control device 1 controls a position and an orientation of a tool with respect to a workpiece.

The numerical control device 1 executes analysis processing and interpolation processing of a machining program 2 for machining of the workpiece. The numerical control device 1 calculates a moving amount 16 by the analysis processing and the interpolation processing and outputs the moving amount 16 to a servo amplifier 7. A motor which is a control target is connected to the servo amplifier 7. A variety of motors drive axes of a machine tool.

The numerical control device 1 includes a program reading unit 3, an inclined-surface setting unit 4, an indexing-angle generating unit 5, and a moving-amount calculating unit 6. The program reading unit 3 reads the machining program 2. The program reading unit 3 carries out analysis processing of the read machining program 2. The program reading unit 3 outputs various commands including an inclined-surface setting command 11, an inclined-surface indexing command 12, and a tool selection command 13, depending on contents of the machining program 2.

The program reading unit 3 outputs the inclined-surface setting command 11 to the inclined-surface setting unit 4. The inclined-surface setting command 11 is a command that instructs setting of an inclined-surface coordinate system 14.

The inclined-surface setting unit 4 sets the inclined-surface coordinate system 14 in accordance with the inclined-surface setting command 11 output from the program reading unit 3. The inclined-surface setting unit 4 can set the inclined-surface coordinate system 14 by an arbitrary method conventionally known.

The inclined-surface coordinate system 14 is a coordinate system that is set with regard to an inclined surface. The inclined surface of the workpiece is a machining surface tilted with respect to a machine coordinate system. The machine coordinate system is a coordinate system that is preset with respect to the machine tool and is used as a reference for position control in the machine tool. The inclined-surface setting unit 4 outputs the inclined-surface coordinate system 14 set in accordance with the inclined-surface setting command 11 to the indexing-angle generating unit 5.

The program reading unit 3 outputs the inclined-surface indexing command 12 and the tool selection command 13 to the indexing-angle generating unit 5. The inclined-surface indexing command 12 is a command that instructs calculation of an indexing angle. The indexing angle is a rotation angle of a rotary axis where a tool in use is oriented perpendicular to the inclined surface.

The tool selection command 13 is a command that instructs selection of any one of tools whose mounting angles are different form each other. The indexing-angle generating unit 5 selects a tool used for machining of the inclined surface, in accordance with the tool selection command 13 output from the program reading unit 3.

The inclined-surface coordinate system 14 set by the inclined-surface setting unit 4 is input to the indexing-angle generating unit 5. The indexing-angle generating unit 5 calculates, in accordance with the inclined-surface indexing command 12 output from the program reading unit 3, the indexing angle regarding the tool that is selected in accordance with the tool selection command 13. When calculating the indexing angle, the indexing-angle generating unit 5 refers to the inclined-surface coordinate system 14.

The indexing-angle generating unit 5 generates a move command 15. The move command 15 is a command that instructs movement of the rotary axis such that the orientation corresponding to the calculated indexing angle is achieved. The indexing-angle generating unit 5 outputs, to the moving-amount calculating unit 6, the move command 15 that is generated with regard to the tool used for the machining of the inclined surface.

The moving-amount calculating unit 6 calculates the moving amount 16 for each control cycle in accordance with the move command 15 output from the indexing-angle generating unit 5. The moving-amount calculating unit 6 calculates the moving amount 16 by interpolation processing depending on the move command 15. The numerical control device 1 outputs the moving amount 16 calculated by the moving-amount calculating unit 6 to the servo amplifier 7.

Figure 2:
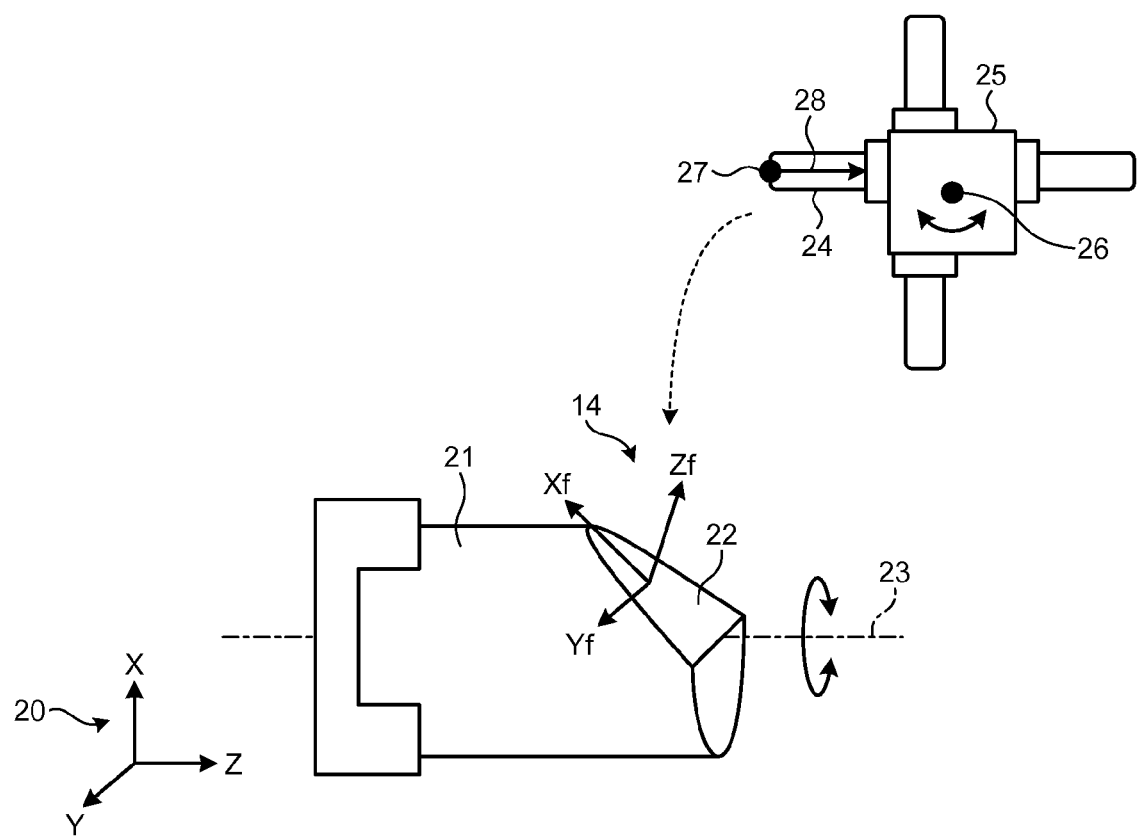
FIG. 2 is a schematic diagram showing a configuration of a machine tool.

FIG. 2 is a schematic diagram showing a configuration of the machine tool. The machine tool is provided with a turret lathe 25. Four tools 24 are mounted on the turret lathe 25. A mounting angle is different for each of the four tools 24. The mounting angle represents an orientation of the tool 24 in a case of a basic position by using an angle around a rotary axis 26 as a center. In the present embodiment, the mounting angle is an angle between an orientation of a tool axis direction vector 28 and a plus direction of a Z-axis, in the case of the basic position where a rotation angle of the turret lathe 25 around the rotary axis 26 is 0 degree. In a case where the mounting angle is 0 degree, the orientation of the tool axis direction vector 28 and the plus direction of the Z-axis coincide with each other.

The turret lathe 25 is mounted so as to be movable in each direction along X, Y, and Z-axes of a machine coordinate axes 20 and rotatable around the rotary axis 26 as a rotation center. The X, Y, and Z-axes are orthogonal to each other. The rotary axis 26 is a B-axis for rotation around the Y-axis. The rotary axis 26 rotates and moves the tools 24 together with the turret late 25.

The workpiece 21 is placed so as to be rotatable around a rotary axis 23 as a rotation center. The rotary axis 23 is a C-axis for rotation around the Z-axis. A inclined surface 22 is a machining surface of the workpiece 21 and is tilted with respect to each of the X, Y, and Z-axes. The inclined-surface coordinate system 14 is a coordinate system defined with respect to the inclined surface 22. The inclined-surface coordinate system 14 consists of Xf, Yf, and Zf-axes that are orthogonal to each other. The origin of the inclined-surface coordinate system 14 is defined at a predetermined position on the inclined surface 22. The Xf-axis and the Yf-axis are defined as directions parallel to the inclined surface 22. The Zf-axis is defined as a direction perpendicular to the inclined surface 22. The plus direction of the Zf-axis is a direction away from the workpiece 21.

In accordance with the inclined-surface setting command 11, the inclined-surface setting unit 4 sets the inclined-surface coordinate system 14 with respect to the inclined surface 22. In accordance with the tool selection command 13, one of the four tools 24 is selected as the tool 24 used for the machining of the inclined surface 22. After the inclined-surface coordinate system 14 is set, the indexing-angle generating unit 5 calculates the indexing angle regarding the selected tool 24 in accordance with the inclined-surface indexing command 12.

The indexing-angle generating unit 5 calculates the rotation angle of each of the rotary axis 23 and the rotary axis 26 where the direction of the tool axis direction vector 28 of the tool 24 coincides with the plus direction of the Zf-axis. Then, the indexing-angle generating unit 5 sets the calculated rotation angle as the indexing angle regarding the tool 24. The tool axis direction vector 28 is a vector along the tool axis and directed from a tip 27 of the tool 24 toward a base of the tool 24. The tool axis direction vector 28 and the rotary axis 26 are orthogonal to each other.

When the direction of the tool axis direction vector 28 of the tool 24 coincides with the plus direction of the Zf-axis, the tool 24 is oriented perpendicular to the inclined surface 22. The indexing-angle generating unit 5 generates the move command 15 that instructs rotation of the rotary axis 23 and the rotary axis 26 such that the orientation corresponding to the calculated indexing angle is achieved. The moving-amount calculating unit 6 calculates the moving amount 16 for each control cycle in accordance with the move command 15. In this manner, the numerical control device 1 can operate the machine tool such that the tool 24 used for the machining of the inclined surface 22 is oriented perpendicular to the inclined surface 22.

Figure 3:
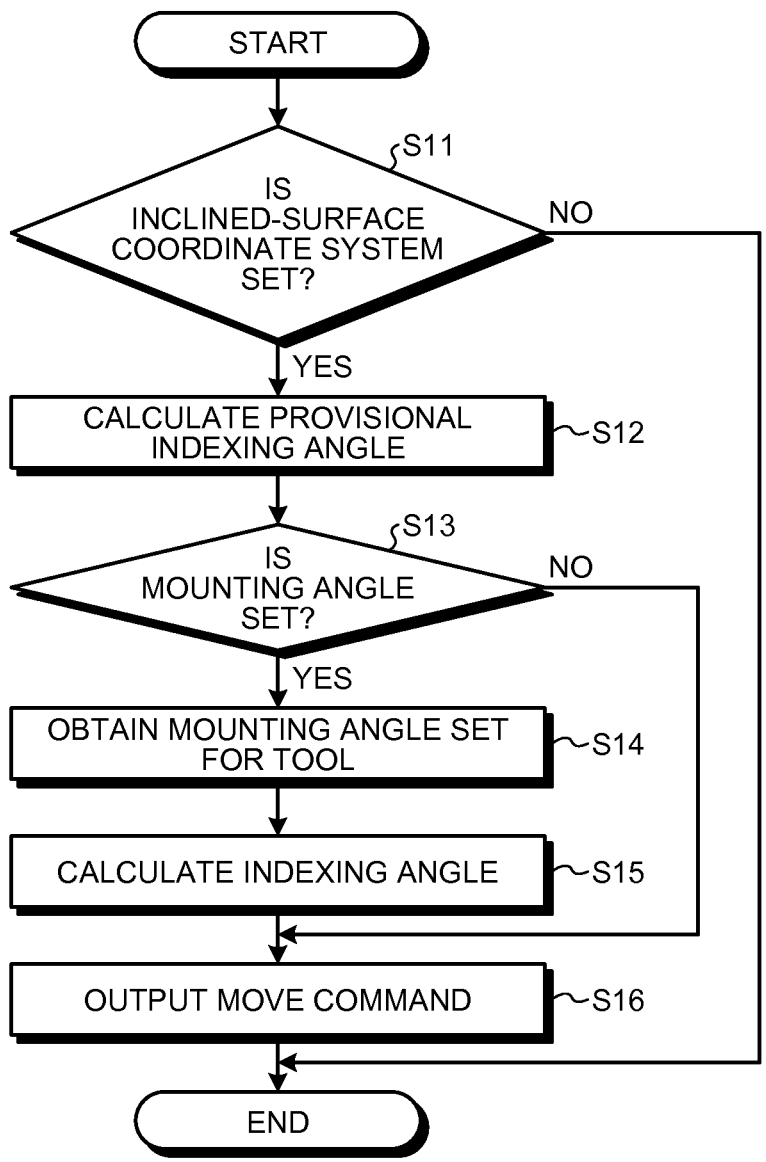
FIG. 3 is a flowchart for explaining an operation of an indexing-angle generating unit.

Calculation of the indexing angle by the indexing-angle generating unit will be described below. FIG. 3 is a flowchart for explaining an operation of the indexing-angle generating unit. When the inclined-surface indexing command 12 is input, the indexing-angle generating unit 5 starts the calculation of the indexing angle.

At Step S11, the indexing-angle generating unit 5 determines whether or not the inclined-surface coordinate system 14 is set with respect to the inclined surface 22 by the inclined-surface setting unit 4. If the inclined-surface coordinate system 14 is not set by the inclined-surface setting unit 4 (Step S11; No), the indexing-angle generating unit 5 ends the processing.

If the inclined-surface coordinate system 14 is set by the inclined-surface setting unit 4 (Step S11; Yes), then the indexing-angle generating unit 5 calculates a provisional indexing angle, at Step S12. The provisional indexing angle is an indexing angle that is provisionally calculated for a tool 24 whose direction of the tool axis direction vector 28 coincides with the plus direction of the Z-axis in the case of the basic position where a rotation angle of the turret lathe 25 around the rotary axis 26 is 0 degree.

Subsequently, the indexing-angle generating unit 5 determines whether or not an mounting angle is set for the tool 24 selected in accordance with the tool selection command 13 (Step S13). The mounting angle being set in Step S13 means that an angle other than 0 degree is set as the mounting angle.

If the mounting angle is set for the selected tool 24 (Step S13; Yes), that is, the mounting angle is other than 0 degree, the indexing-angle generating unit 5 obtains the mounting angle set for the selected tool 24 (Step S14). An example of obtaining the mounting angle will be described later.

After obtaining the mounting angle, the indexing-angle generating unit 5 subtracts the obtained mounting angle from the provisional indexing angle to calculate the indexing angle regarding the selected tool 24 (Step S15). The indexing-angle generating unit 5 generates the move command 15 for rotating the rotary axis 26 such that the orientation corresponding to the indexing angle calculated at Step S15 is achieved.

On the other hand, if the mounting angle is not set for the selected tool 24 (Step S13; No), that is, the mounting angle is 0 degree, the indexing-angle generating unit 5 uses the provisional indexing angle generated at Step S12 as the indexing angle for the selected tool 24 to generate the move command.

The indexing-angle generating unit 5 outputs the move command 15 that is generated by the above-mentioned procedures (Step S16). The indexing-angle generating unit 5 outputs the move command 15 to end the processing.

Figures 4, 5:
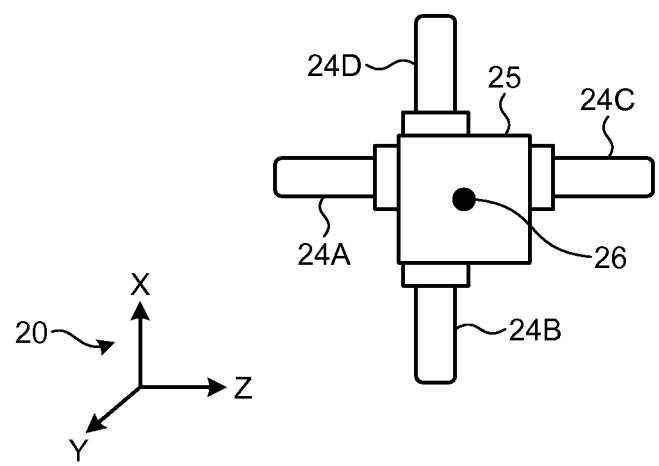
FIG. 4 is a diagram for explaining a correspondence relationship between tools and mounting angles.
FIG. 5 is a diagram showing an example of setting of the correspondence relationship between the tools and the mounting angles on an NC screen.

FIG. 4 is a diagram for explaining a correspondence relationship between tools and mounting angles. Mounting angles of tools 24A, 24B, 24C, and 24D are 0 degree, 90 degrees, 180 degrees, and 270 degrees, respectively. For example, the correspondence relationship between the tools 24A, 24B, 24C, and 24D and the mounting angles is preset by an input operation on an NC screen by an operator. In this case, the indexing-angle generating unit 5 calculates the indexing angle by using the mounting angle that is preset for each of the tools 24.

FIG. 5 is a diagram showing an example of setting of the correspondence relationship between the tools and the mounting angles on the NC screen. In FIG. 5, "A", "B", "C", and "D" shown in a column of "tool" respectively indicate the tools 24A, 24B, 24C, and 24D shown in FIG. 4. At Step S14, the indexing-angle generating unit 5 refers to the preset correspondence relationship between the tools 24A to 24D and the mounting angles to obtain the mounting angle regarding the tool 24 used for the machining.

Besides the method that refers to the correspondence relationship between the tools 24 and the mounting angles that is set by the operator, the indexing-angle generating unit 5 can obtain the mounting angle of the tool 24 by an arbitrary method. For example, the indexing-angle generating unit 5 can obtain the mounting angle from the machining program 2 that is prepared to include a command for the mounting angle.

Figure 6:
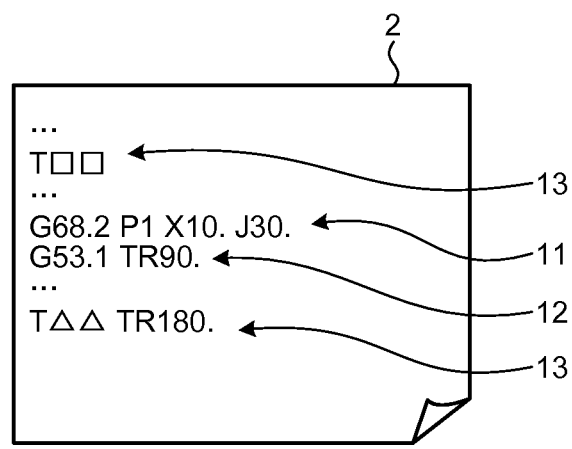
FIG. 6 is a diagram showing an example of a machining program that includes a command for an mounting angle.

FIG. 6 is a diagram showing an example of the machining program including a command for an mounting angle. In the machining program 2, the mounting angle of the tool 24 is described along with the tool selection command 13 for instructing selection of the tool 24 or the inclined-surface indexing command 12, for example.

In the example of the machining program 2 shown in FIG. 6, "TR180." that is added to a tool selection command 13 represents a command that specifies the mounting angle of the tool 24C as 180 degrees. Similarly, "TR90." that is added to an inclined-surface indexing command 12 represents a command that specifies the mounting angle of the tool 24B as 90 degrees.

The program reading unit 3 outputs, to the indexing-angle generating unit 5, the command for the mounting angle together with the inclined-surface indexing command 12 or the tool selection command 13. The indexing-angle generating unit 5 obtains the mounting angle from the command for the mounting angle. In this manner, the indexing-angle generating unit 5 calculates the indexing angle by using information of the mounting angle that is added to either the inclined-surface indexing command 12 or the tool selection command 13.

According to the first embodiment, the numerical control device 1 can calculate the indexing angle by the same command for any of the tools 24 used in the machining of the inclined surface 22, irrespective of the mounting angle. The numerical control device 1 can automatically calculate, without complicating the machining program 2, the indexing angle for any of the tools 24 whose mounting angles are different from each other.

The numerical control device 1 can calculate the indexing angle used for generating the move command 15, without an individual computation depending on the tool 24 to be used. It is thus possible to improve the work efficiency in the control of the tool orientation. In this manner, the numerical control device 1 makes it possible to calculate, without complicating the machining program 2, the indexing angle for the plurality of tools 24 extending in respectively different directions and to improve the work efficiency in the control of the tool orientation.

Second Embodiment

Figure 7:
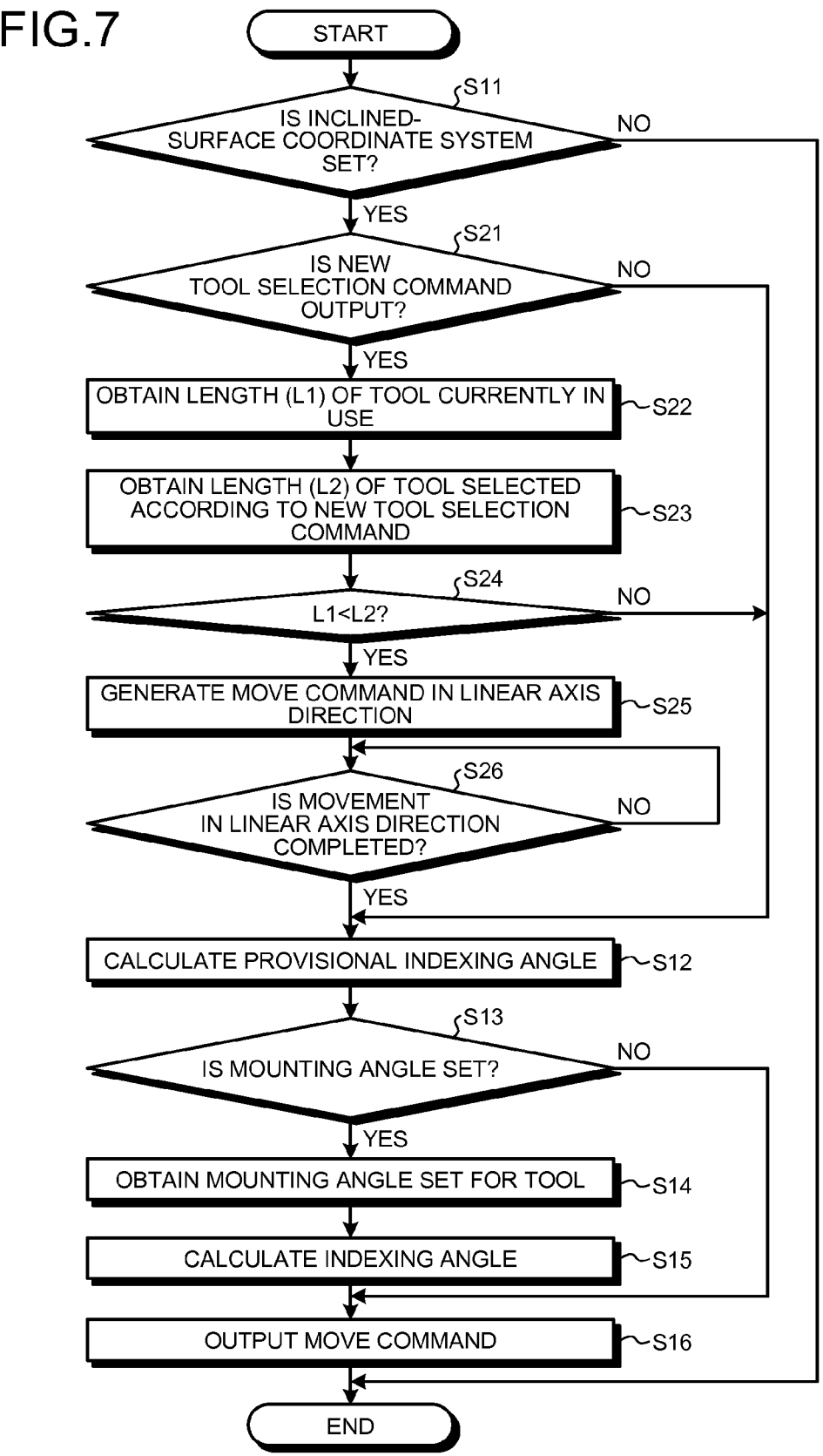
FIG. 7 is a flowchart for explaining an operation of an indexing-angle generating unit included in a numerical control device according to a second embodiment of the present invention.

FIG. 7 is a flowchart for explaining an operation of an indexing-angle generating unit included in a numerical control device according to a second embodiment of the present invention. The numerical control device according to the present embodiment has the same configuration as that of the numerical control device 1 according to the first embodiment (see FIG. 1). The same reference numerals are given to the same components as in the first embodiment and an overlapping description will be omitted as appropriate.

The operation of the indexing-angle generating unit 5 in the present embodiment is obtained by adding Steps S21 to S26 to the operation in the case of the first embodiment shown in FIG. 3. At Step S11, the indexing-angle generating unit 5 determines whether or not the inclined-surface coordinate system 14 is set with respect to the inclined surface 22 by the inclined-surface setting unit 4. If the inclined-surface coordinate system 14 is not set by the inclined-surface setting unit 4 (Step S11; No), the indexing-angle generating unit 5 ends the processing.

If the inclined-surface coordinate system 14 is set by the inclined-surface setting unit 4 (Step S11; Yes), the indexing-angle generating unit 5 determines whether or not a new tool selection command 13 is output after the inclined-surface indexing command 12 regarding the tool 24 currently in use (Step S21). If no new tool selection command 13 is output (Step S21; No), the indexing-angle generating unit 5 proceeds to the operation at Step S12.

If a new tool selection command 13 is output (Step S21; Yes), the indexing-angle generating unit 5 obtains a tool axis direction length L1 of the tool 24 currently in use (Step S22). Subsequently, the indexing-angle generating unit 5 obtains a tool axis direction length L2 of the tool 24 that is selected in accordance with the new tool selection command 13 (Step S23).

The indexing-angle generating unit 5 compares L1 obtained at Step S22 and L2 obtained at Step S23 (Step S24). If a relationship L1<L2 is satisfied (Step S24; Yes), that is, if the tool 24 selected in accordance with the new tool selection command 13 is longer than the tool 24 currently in use, the indexing-angle generating unit 5 calculates a difference $\Delta L=(L2-L1)$ between L1 and L2.

After calculating $\Delta L$, the indexing-angle generating unit 5 generates a move command 15 that instructs movement (retraction) toward the plus direction of the Zf-axis by a distance corresponding to $\Delta L$ (Step S25). The Zf-axis is a linear axis perpendicular to the inclined surface 22 in the inclined-surface coordinate system 14. The indexing-angle generating unit 5 outputs the generated move command 15. On the other hand, if the relationship L1<L2 is not satisfied (Step S24; No), that is, if the tool 24 selected in accordance with the new tool selection command 13 is shorter than or has the same length as the tool 24 currently in use, the indexing-angle generating unit 5 proceeds to the operation at Step S12.

In response to the move command 15 output from the indexing-angle generating unit 5, the moving-amount calculating unit 6 calculates the moving amount 16 in the Zf-axis direction. The numerical control device 1 moves the tools 24 together with the turret lathe 25 by the distance of $\Delta L$ in the Zf-axis plus direction.

At Step S26, the indexing-angle generating unit 5 determines whether or not the movement of the turret lathe 25 in the Zf-axis direction is completed. If the movement of the turret lathe 25 in the Zf-axis direction is not yet completed (Step S26; No), the indexing-angle generating unit 5 returns to Step S26 and waits until the movement of the turret lathe 25 is completed.

If the movement of the turret lathe 25 in the Zf-axis direction is completed (Step S26; Yes), the indexing-angle generating unit 5 proceeds to the operation at Step S12. At Step S12 and subsequent Steps, the indexing-angle generating unit 5 operates in the same manner as at Step S12 and subsequent Steps in the case of the first embodiment. The indexing-angle generating unit 5 performs, regarding the tool 24 selected in accordance with the new tool selection command 13, the calculation of the indexing angle (Step S15) and the output of the move command 15 for the rotary axis (Step S16).

Figure 8:
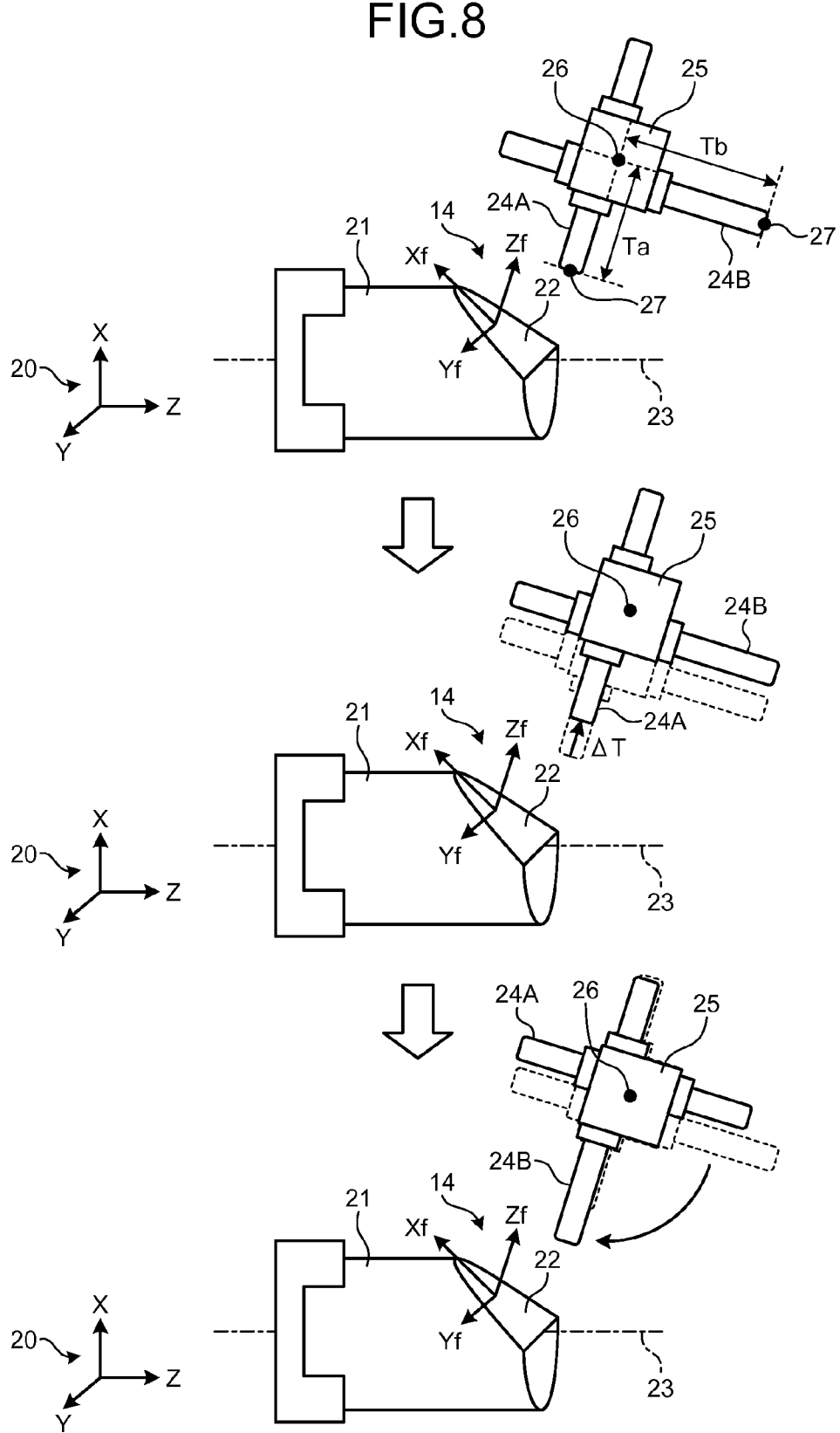
FIG. 8 is a diagram for explaining an example of an operation of a machine tool.

FIG. 8 is a diagram for explaining an example of an operation of the machine tool. Here, an operation of the machine tool performed when the tool 24 used for the machining of the inclined surface 22 is changed from the tool 24A to the tool 24B is explained as an example. A tool axis direction length Tb of the tool 24B is larger than a tool axis direction length Ta of the tool 24A (i.e. Ta<Tb). The lengths Ta and Tb of the tools 24A and 24B each is a length from the rotation center of the rotary axis 26 to the tip 27.

When a tool selection command 13 that instructs selection of a new tool 24B is input, the indexing-angle generating unit 5 obtains the length Ta of the tool 24A currently in use and the length Tb of the tool 24B selected in accordance with the new tool selection command 13. The indexing-angle generating unit 5 can obtain the lengths Ta and Tb by an arbitrary method, as in the case of the mounting angle in the first embodiment.

For example, the numerical control device 1 stores data of the length of each tool 24 in advance. The indexing-angle generating unit 5 obtains the lengths Ta and Tb by referring to such data. Besides, the indexing-angle generating unit 5 can obtain the lengths Ta and Tb from the machining program 2 that is prepared to include information regarding the lengths of the tools 24.

Since the relationship Ta<Tb is satisfied, the indexing-angle generating unit 5 calculates a difference Δ=(Tb−Ta) between Ta and Tb. After generating ΔT, the indexing-angle generating unit 5 generates a move command 15 that instructs movement (retraction) in the plus direction of the Zf-axis being the linear axis by a distance corresponding to ΔT. In response to the move command 15, the machine tool moves the tools 24A together with the turret lathe 25 by ΔT in a direction perpendicular to the inclined surface 22 and away from the inclined surface 22.

After finishing the movement of the turret lathe 25 in the Zf-axis direction, the indexing-angle generating unit 5 calculates the indexing angle regarding the tool 24B. The machine tool rotates the rotary axis 26 such that the orientation corresponding to the indexing angle calculated by the indexing-angle generating unit 5 is achieved.

According to the second embodiment, the numerical control device 1 can calculate the indexing angle regarding the newly selected tool 24 without complicating the machining program 2 and it is thus possible to improve the work efficiency in the control of the tool orientation, as in the case of the first embodiment. Furthermore, according to the second embodiment, the numerical control device 1 can minimize the movement of the tool 24 when changing the tool 24 used for the machining of the inclined surface 22. As a result, the numerical control device 1 has an effect of enabling reduction in a machining time by the machine tool.

In the present embodiment, the numerical control device 1 is not limited to the configuration that always moves the tool 24 in the linear axis direction if the tool 24 selected in accordance with the tool selection command 13 is longer than the tool 24 currently in use. If the tool 24 is positioned sufficiently away from the workpiece 21, the numerical control device 1 does not have to move the tool 24 in the linear axis direction.

Figure 9:
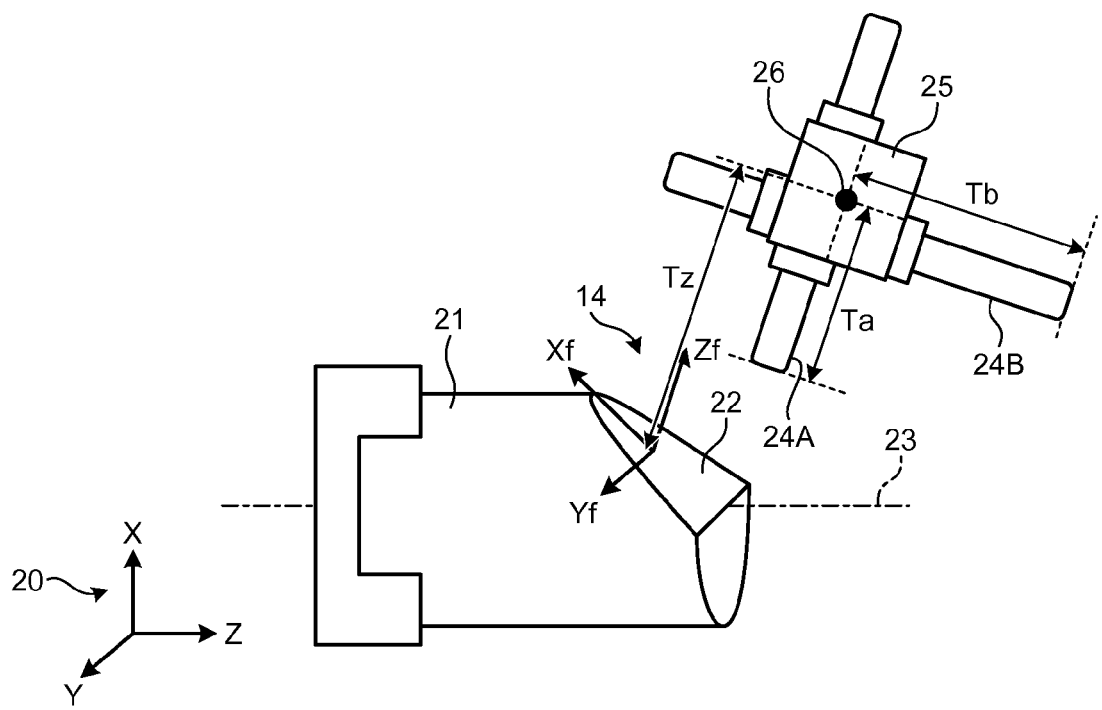
FIG. 9 is a diagram for explaining determination of whether movement of a tool in a linear axis direction is necessary or not.

FIG. 9 is a diagram for explaining determination of whether or not the movement of the tool in the linear axis direction is necessary. The indexing-angle generating unit 5 compares a length Tz in the Zf-axis direction between the origin of the inclined-surface coordinate system 14 and the rotary axis 26 with the length Tb of the tool 24B that is selected in accordance with the new tool selection command 13.

If a relationship Tz>Tb is satisfied, the indexing-angle generating unit 5 determines that the tool 24B is positioned sufficiently away from the workpiece 21 and thus the movement of the tools 24 in the linear axis direction is unnecessary. In this case, the indexing-angle generating unit 5 does not generate the move command 15 regarding the linear axis direction. If the relationship Tz>Tb is not satisfied, the indexing-angle generating unit 5 determines that the movement of the tool 24 in the linear axis direction is necessary. In this case, the indexing-angle generating unit 5 generates the move command 15 regarding the linear axis direction.

When determining that the tool 24 is positioned sufficiently away from the workpiece 21, the numerical control device 1 can omit the movement of the tool 24 in the linear axis direction to reduce an unnecessary retracting operation of the tool 24. As a result, the numerical control device 1 can further reduce the machining time of the machine tool.

Figure 10:
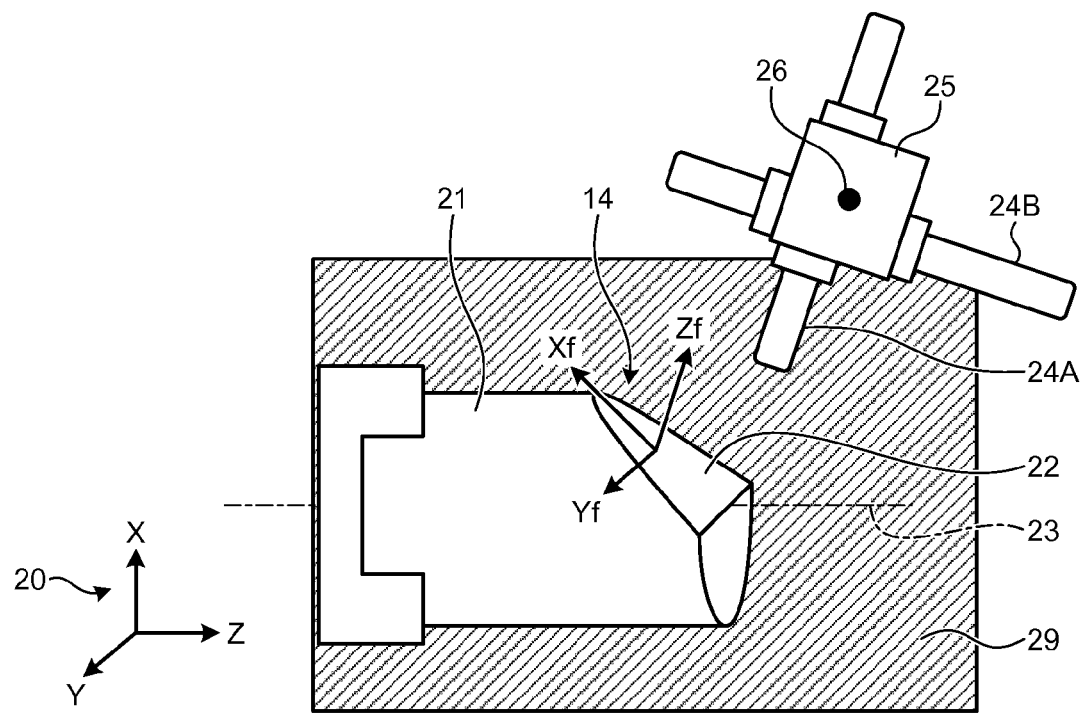
FIG. 10 is a diagram for explaining determination of whether movement of a tool is necessary or not based on a tool retraction necessary region.

Besides, the indexing-angle generating unit 5 can determine, based on a tool retraction necessary region set in advance, whether or not the movement of the tool 24 in the linear axis direction is necessary. FIG. 10 is a diagram for explaining the determination of whether or not the movement of the tool is necessary based on the tool retraction necessary region.

For example, a tool retraction necessary region 29 is set in an XZ-plane direction. The tool retraction necessary region 29 is set to be a region surrounding the workpiece 21 in the plus and minus directions of the X-axis and the plus direction of the Z-axis with respect to the workpiece 21. The tool retraction necessary region 29 may be set depending on, for example, a length of the longest tool 24 among the tools 24.

If the rotation center of the rotary axis 26 is outside the range of the tool retraction necessary region 29, the indexing-angle generating unit 5 determines that the tool 24 is positioned sufficiently away from the workpiece 21 and thus the movement of the tool 24 in the linear axis direction is unnecessary. If the rotation center of the rotary axis 26 is within the range of the tool retraction necessary region 29, the indexing-angle generating unit 5 determines that the movement of the tool 24 in the linear axis direction is necessary.

In this case also, the numerical control device 1 can reduce the machining time of the machine tool by reducing an unnecessary retracting operation of the tool 24. By setting the tool retraction necessary region 29 in advance, the indexing-angle generating unit 5 can determine, with simple processing, whether or not the movement of the tool 24 is necessary.

In the present embodiment, the numerical control device 1 may move the tool 24 in a direction toward the workpiece 21, in a case where the tool 24 is determined to be positioned sufficiently away from the workpiece 21 and the tool 24 selected in accordance with the tool selection command 13 is shorter than the tool 24 currently in use.

Figure 11:
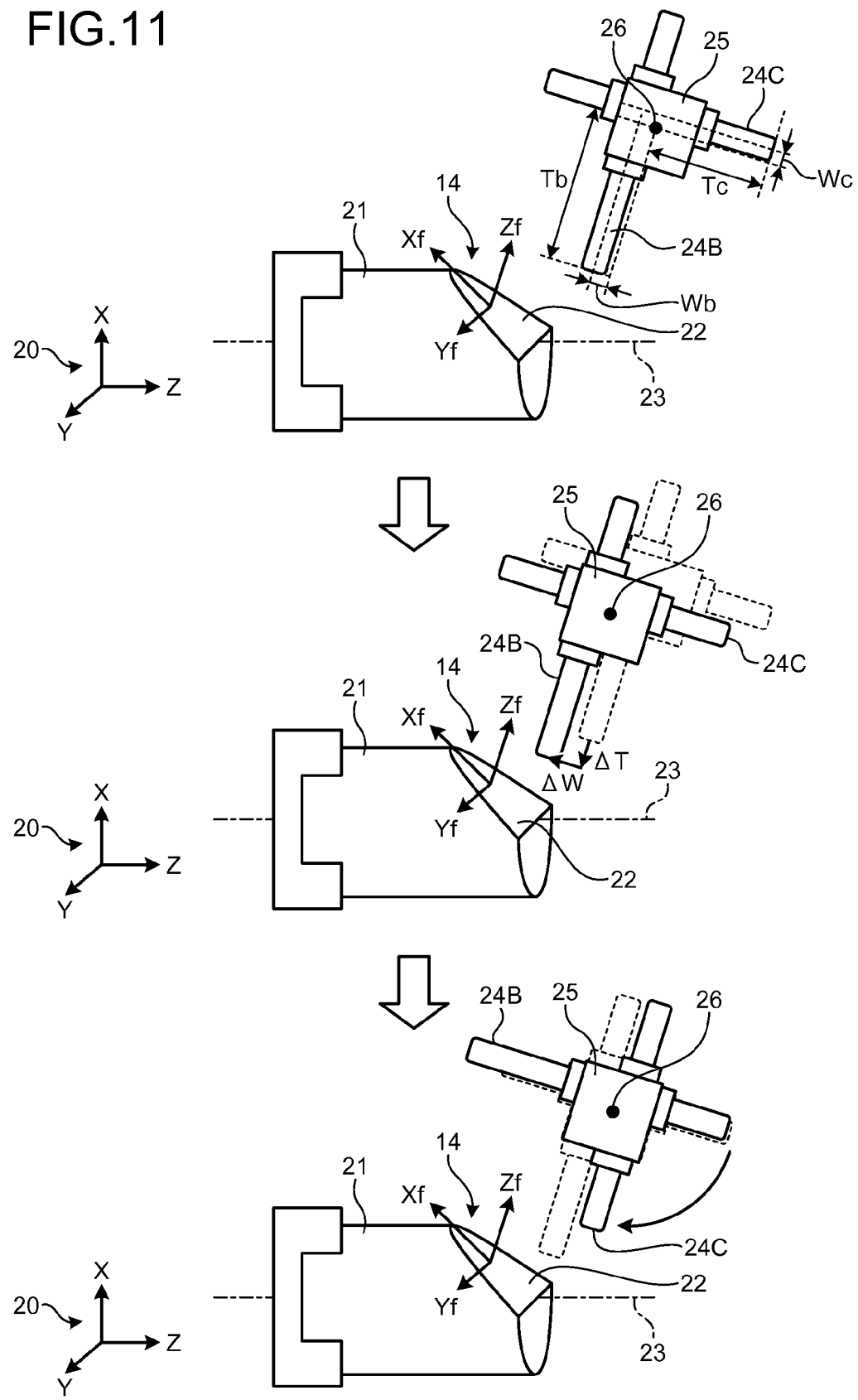
FIG. 11 is a diagram for explaining movement of a tool in a direction toward workpiece.

FIG. 11 is a diagram for explaining the movement of the tool in the direction toward the workpiece. When a tool selection command 13 that instructs to newly select a tool 24C is input, the indexing-angle generating unit 5 obtains the length Tb of the tool 24B currently in use and a length Tc of the tool 24C that is selected in accordance with the new tool selection command 13.

The tool axis direction length Tc of the tool 24C is smaller than the tool axis direction length Tb of the tool 24B (Tb>Tc). The indexing-angle generating unit 5 calculates a difference ΔT=(Tb−Tc) between Tb and Tc. After calculating ΔT, the indexing-angle generating unit 5 generates a move command 15 that instructs movement (approach) in a minus direction of the Zf-axis being the linear axis by a distance corresponding to ΔT. In response to the move command 15, the machine tool moves the tool 24B together with the turret lathe 25 by ΔT in a direction perpendicular to the inclined surface 22 and toward the inclined surface 22.

When a new tool selection command 13 that instructs selection of a new tool 24 is input, the indexing-angle generating unit 5 may further generate a move command 15 regarding the Xf-axis direction. The Xf-axis is a linear axis parallel to the inclined surface 22 in the inclined-surface coordinate system 14. The Xf-axis direction coincides with a width direction perpendicular to the tool axis of the tool 24 currently in use. It should be noted that, in the following explanation, a width means an interval between the tool axis of the tool 24 and a center position of the rotary axis 26.

In this case, the indexing-angle generating unit 5 obtains a width Wb from the position of the tool axis of the tool 24B currently in use to the rotation center of the rotary axis 26. The indexing-angle generating unit 5 obtains a width Wc from the position of the tool axis of the newly-selected tool 24C to the rotation center of the rotary axis 26. The indexing-angle generating unit 5 can obtain the widths Wb and Wc by an arbitrary method, as in the case of obtaining the tool axis direction length of the tool 24.

For example, the numerical control device 1 holds data of the widths of the tools 24 in advance. The indexing-angle generating unit 5 obtains the widths Wb and Wc by referring to such the data. Besides, the indexing-angle generating unit 5 can obtain the widths Wb and Wc from the machining program 2 that is prepared to include information regarding the widths of the tools 24.

The indexing-angle generating unit 5 calculates a difference $\Delta W=(Wb-Wc)$ between Wb and Wc. After calculating $\Delta W$, the indexing-angle generating unit 5 generates a move command 15 that instructs movement in, for example, the plus direction of the Xf-axis being the linear axis by a distance corresponding to $\Delta W$. In response to the move command 15, the machine tool moves the tool 24B together with the turret lathe 25 by $\Delta W$ in a direction toward the origin of the inclined-surface coordinate system 14 among width directions regarding the tool 24.

It should be noted that the indexing-angle generating unit 5 determines which of the plus direction and the minus direction of the Xf-axis should be the movement direction, depending on a magnitude relationship between the width of the tool 24 currently in use and the width of the tool 24 selected in accordance with the tool selection command 13. For example, if the width of the tool 24 currently in use is larger than the width of the tool 24 selected in accordance with the tool selection command 13, the indexing-angle generating unit 5 generates the move command 15 in the plus direction of the Xf-axis. If the width of the tool 24 currently in use is smaller than the width of the tool 24 selected in accordance with the tool selection command 13, the indexing-angle generating unit 5 generates the move command 15 in the minus direction of the Xf-axis.

When the tool 24 is selected in accordance with the new tool selection command 13, the numerical control device 1 moves the tool 24 in the Zf-axis direction and the Xf-axis direction which are two directions orthogonal to each other, which can bring the position of the tip 27 of the tool 24 to be used next in line with the position of the tip 27 of the tool 24 currently in use. As a result, the numerical control device 1 can reduce a positioning command involved in the change of the tool 24 and thus further reduce the machining time of the machine tool.

It should be noted that even when the tool 24 selected in accordance with the tool selection command 13 is longer than the tool 24 currently in use, the indexing-angle generating unit 5 can generate the move command 15 regarding the Xf-axis direction together with the move command 15 regarding the Zf-axis direction. In this case also, the numerical control device 1 can reduce a positioning command involved in the change of the tool 24 and thus further reduce the machining time of the machine tool.

REFERENCE SIGNS LIST 1 numerical control device
2 machining program
3 program reading unit
4 inclined-surface setting unit
5 indexing-angle generating unit
6 moving-amount calculating unit
7 servo amplifier
11 inclined-surface setting command
12 inclined-surface indexing command
13 tool selection command
14 inclined-surface coordinate system
15 move command
16 moving amount
20 machine coordinate axis
21 workpiece
22 inclined surface
23 rotary axis
24, 24a, 24b, 24c, 24d tools
25 turret lathe
26 rotary axis
27 tip
28 tool axis direction vector
29 tool retraction necessary region

The invention claimed is:

1. A numerical control device that controls a position and an orientation of a tool with respect to a workpiece, the tool being one of a plurality of tools mounted on a turret lathe, a mounting angle being different for each of the plurality of tools, the numerical control device comprising:

a program reading unit configured to read a machining program for machining of the workpiece;

an inclined-surface setting unit configured to set an inclined-surface coordinate system with regard to an inclined surface of the workpiece, wherein the inclined surface is a machining surface tilted with respect to a machine coordinate system used as a reference for position control, an indexing angle is a rotation angle of each of a tool-side rotary axis and a workpiece-side rotary axis where the tool used for machining of the inclined surface is oriented perpendicular to the inclined surface, the tool-side rotary axis is a rotary axis serving as a rotation center of the turret lathe, and the workpiece-side rotary axis is a rotary axis serving as a rotation center of the workpiece;

an indexing-angle generating unit configured to receive the inclined-surface coordinate system set by the inclined-surface setting unit, to calculate the indexing angle by using the mounting angle, and to generate a move command that instructs rotation of the tool-side rotary axis and the workpiece-side rotary axis so that the orientation corresponding to the calculated indexing angle is achieved; and a moving-amount calculating unit configured to calculate a moving amount for each control cycle in accordance with the move command, wherein the program reading unit outputs, depending on contents of the machining program, an inclined-surface setting command that instructs setting of the inclined-surface coordinate system, an inclined-surface indexing command that instructs calculation of the indexing angle, and a tool selection command that instructs selection of any one of the plurality of tools as the tool, wherein the inclined-surface setting unit sets the inclined-surface coordinate system in accordance with the inclined-surface setting command output from the program reading unit, and wherein the indexing-angle generating unit calculates, in accordance with the inclined-surface indexing command output from the program reading unit, the indexing angle regarding the tool that is selected in accordance with the tool selection command output from the program reading unit.

2. The numerical control device according to claim 1, wherein when a new tool selection command is output after the inclined-surface indexing command regarding the tool currently in use, the indexing-angle generating unit calculates the indexing angle regarding the tool that is selected in accordance with the new tool selection command.

3. The numerical control device according to claim 1, wherein the indexing-angle generating unit calculates the indexing angle by using the mounting angle that is preset for each of the plurality of tools.

4. The numerical control device according to claim 1, wherein the indexing-angle generating unit calculates the indexing angle by using information of the mounting angle that is added to either the inclined-surface indexing command or the tool selection command.

5. The numerical control device according to claim 2, wherein when a tool axis direction length of the tool selected in accordance with the new tool selection command is larger than a tool axis direction length of the tool currently in use, the indexing-angle generating unit generates another move command that instructs movement of the tool currently in use in a direction along a first liner axis perpendicular to the inclined surface in the inclined-surface coordinate system.

6. The numerical control device according to claim 5, wherein when a length between an origin of the inclined-surface coordinate system and the tool-side rotary axis is larger than the tool axis direction length of the tool selected in accordance with the new tool selection command, the indexing-angle generating unit determines that the movement of the tool currently in use in the direction along the first linear axis is unnecessary.

7. The numerical control device according to claim 2, wherein when a tool axis direction length of the tool selected in accordance with the new tool selection command is smaller than a tool axis direction length of the tool currently in use, the indexing-angle generating unit generates another move command that instructs movement of the tool currently in use in a direction along a first liner axis perpendicular to the inclined surface in the inclined-surface coordinate system.

8. The numerical control device according to claim 5, wherein the indexing-angle generating unit further generates a still another move command that instructs movement of the tool currently in use in a direction along a second linear axis parallel to the inclined surface in the inclined-surface coordinate system.

9. The numerical control device according to claim 6, wherein the indexing-angle generating unit further generates a still another move command that instructs movement of the tool currently in use in a direction along a second linear axis parallel to the inclined surface in the inclined-surface coordinate system.

10. The numerical control device according to claim 7, wherein the indexing-angle generating unit further generates a still another move command that instructs movement of the tool currently in use in a direction along a second linear axis parallel to the inclined surface in the inclined-surface coordinate system.

* * * * *